(12) United States Patent
Wolf et al.

(10) Patent No.: US 9,989,381 B2
(45) Date of Patent: Jun. 5, 2018

(54) ANGLE SENSOR WITH MAGNETIC PATTERNS

(71) Applicants: TE Connectivity Germany GmbH, Bensheim (DE); TE Connectivity Sensors Germany GmbH, Dortmund (DE)

(72) Inventors: Marco Wolf, Hochstadt (DE); Martin Rieder, Schifferstadt (DE); Michael Ludwig, Mannheim (DE); Armin Meisenberg, Dortmund (DE); Axel Bartos, Waltrop (DE)

(73) Assignees: TE Connectivity Germany GmbH, Bensheim (DE); TE Connectivity Sensors Germany GmbH, Dortmund (DE)

( * ) Notice: Subject to any disclaimer, the term of this patent is extended or adjusted under 35 U.S.C. 154(b) by 0 days. days.

(21) Appl. No.: 15/334,703

(22) Filed: Oct. 26, 2016

(65) Prior Publication Data

US 2017/0115134 A1    Apr. 27, 2017

(30) Foreign Application Priority Data

Oct. 26, 2015  (EP) .................................... 15191500

(51) Int. Cl.
  *G01D 5/16*   (2006.01)
  *G01B 7/30*   (2006.01)
  *G01D 5/14*   (2006.01)
  *G01D 5/245*  (2006.01)

(52) U.S. Cl.
  CPC .............. *G01D 5/16* (2013.01); *G01D 5/145* (2013.01); *G01D 5/2452* (2013.01)

(58) Field of Classification Search
  CPC ........ G01D 5/16; G01D 5/145; G01D 5/2452; G01D 5/14; G01D 5/245
  See application file for complete search history.

(56) References Cited

U.S. PATENT DOCUMENTS

| | | | |
|---|---|---|---|
| 7,229,746 B2* | 6/2007 | Schroeder | G01D 5/145 324/207.22 |
| 2011/0069390 A1* | 3/2011 | Yoshida | G01D 5/3473 359/573 |
| 2016/0011015 A1* | 1/2016 | Angelis | G01D 5/245 324/207.25 |

FOREIGN PATENT DOCUMENTS

| | | |
|---|---|---|
| DE | 10038296 A1 | 2/2002 |
| DE | 102005042616 A1 | 3/2007 |
| DE | 102008008377 B3 | 9/2009 |
| EP | 2302333 A2 | 3/2011 |
| WO | 2014131434 A1 | 9/2014 |

OTHER PUBLICATIONS

European search report, dated Jun. 2, 2016, 8 pages.
(Continued)

*Primary Examiner* — Jay Patidar
(74) *Attorney, Agent, or Firm* — Barley Snyder (57) ABSTRACT

An angle sensor is disclosed. The angle sensor has a disc, a first magnetic pattern disposed on a side of the disc and including a number N1 of first portions of spirals regularly distributed in a first ring, and a second magnetic pattern disposed on a side of the disc and including a number N2 of second portions of spirals regularly distributed in a second ring. The numbers N1 and N2 are coprime and N1 is different from N2, N2−1, and N2+1.

21 Claims, 9 Drawing Sheets

(56) References Cited

OTHER PUBLICATIONS

Abstract of DE 10038296, dated Feb. 14, 2002, 2 pages.
Abstract of DE 102008008377, dated Sep. 24, 2009, 1 page.
Abstract of DE 102005042616, dated Mar. 15, 2007, 1 page.

\* cited by examiner

ANGLE SENSOR WITH MAGNETIC PATTERNS

CROSS-REFERENCE TO RELATED APPLICATION

This application claims the benefit of the filing date under 35 U.S.C. § 119(a)-(d) of European Patent Application No. 15191500.6, filed on Oct. 26, 2015.

FIELD OF THE INVENTION

The present invention relates to an angle sensor, and more particularly, to an angle sensor for determining the absolute angular position of a rotor of an electrical engine.

BACKGROUND

An angle sensor for determining the absolute angular position of a rotating axis is disclosed in DE 100 38 296 A1 and DE 10 2005 042 616 A1. The disclosed angle sensor comprises a disc with two magnetic patterns that can be scanned by magnetic sensors, for example, Hall sensors. Each pattern includes Archimedean spiral sections uniformly distributed in a ring. The number of spirals sections in the two rings differs by one.

As the number of spirals sections in the two rings differs only by one, these known angle sensors require a high number of spirals section in each ring in order to achieve a desired accuracy of the angular position determination. However, a high number of spiral sections in a ring implies a decreased distance between adjacent spiral sections, which raises the production costs and makes the measurement prone to external magnetic stray fields.

SUMMARY

An object of the invention, among others, is to provide an angle sensor which can be produced at a low cost. The disclosed angle sensor has a disc, a first magnetic pattern disposed on a side of the disc and including a number N1 of first portions of spirals regularly distributed in a first ring, and a second magnetic pattern disposed on a side of the disc and including a number N2 of second portions of spirals regularly distributed in a second ring. The numbers N1 and N2 are coprime and N1 is different from N2, N2−1, and N2+1.

BRIEF DESCRIPTION OF THE DRAWINGS

The invention will now be described by way of example with reference to the accompanying figures, of which.

DETAILED DESCRIPTION OF THE EMBODIMENT(S)

The invention is explained in greater detail below with reference to embodiments of an angle sensor. This invention may, however, be embodied in many different forms and should not be construed as limited to the embodiments set forth herein; rather, these embodiments are provided so that this disclosure will be thorough and complete and still fully convey the scope of the invention to those skilled in the art.

The angle sensor according to the present invention comprises a disc 100 and two magnetic sensors 231, 232, as shown in FIGS. 1-4. The major components of the invention will now be described in greater detail.

Figure 1:
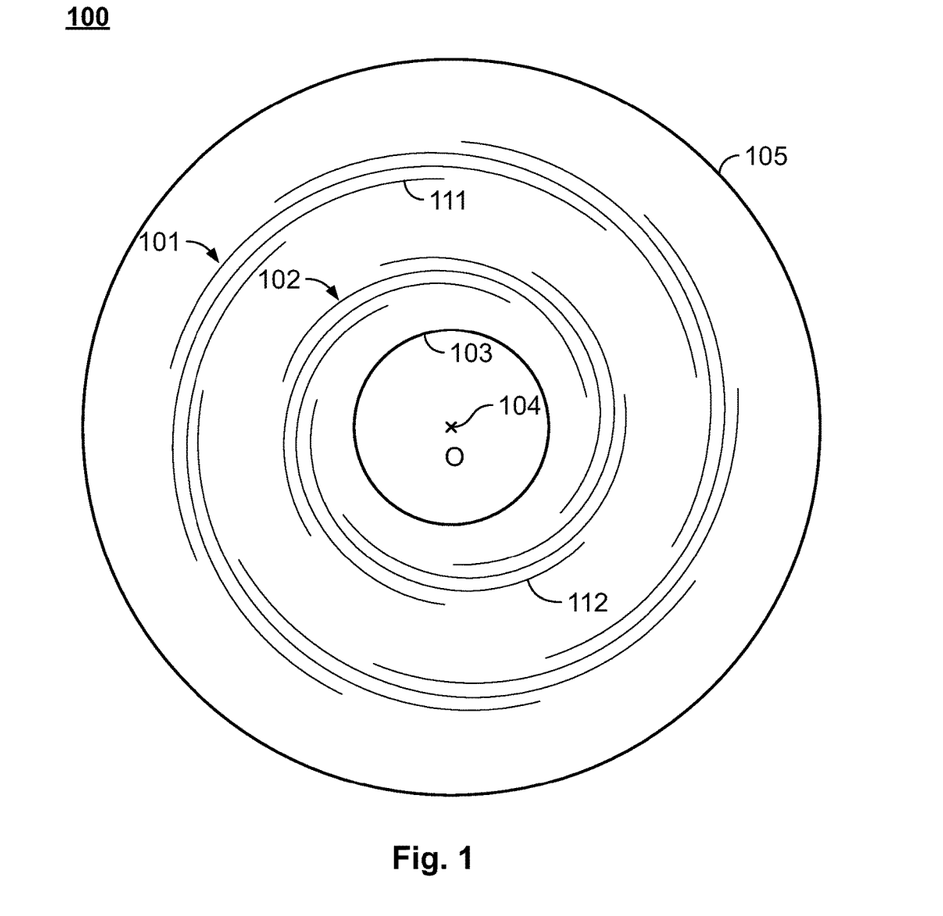
FIG. 1 is a plan view of a disc used in an angle sensor according to the invention.

The disc 100 is shown generally in FIG. 1. The disc 100 extends between the outer (circular) periphery 105 and the inner (circular) periphery 103. Inner periphery 103 and outer periphery 105 are concentrically arranged relative to the center point 104 of the disc 100.

A first magnetic pattern 101 and a second magnetic pattern 102 are fixedly formed on a side of the disc 100. In the embodiment of FIG. 1, the disc 100 includes the first magnetic pattern 101 and the second magnetic pattern 102 on the same side of the disc 100, however, the first magnetic pattern 101 could be positioned on one side of the disc 100 and the second magnetic pattern 102 could be positioned on an opposite side of the disc 100.

The first magnetic pattern 101 includes a number N1 of first portions of spirals 111 which are regularly distributed in a first ring enclosing the first magnetic pattern 101, and the second magnetic pattern 102 includes a number N2 of second portions of spirals 112 which are regularly distributed in a second ring enclosing the second magnetic pattern 102. The first ring of the first magnetic pattern 101 and the second ring of the second magnetic pattern 102 are concentrically arranged relative to the center point 104 of the disc 100. The first ring of the first magnetic pattern 101 surrounds the second ring of the second magnetic pattern 102. The number of first portions of spirals 111, N1, is different from the number of second portions of spirals 112, N2, and the number of first portions of spirals 111 of the first magnetic pattern 101 (i.e. the outer magnetic pattern), N1, is greater than the number of second portions of spirals 112 of the second magnetic pattern 102 (i.e. the inner magnetic pattern), N2. According to the present invention, the numbers N1 and N2 are coprime, wherein the number N1 is different from the numbers N2−1 and N2+1; there is no number, other than 1, that divides both N1 and N2. In the embodiment shown in FIG. 1, N1 is equal to 9, and N2 is equal to 7.

Each portion of spiral 111, 112 of the first magnetic pattern 101 and the second magnetic pattern 102 has a nonzero width in the radial direction of the disc 100 and all spirals 111, 112 belonging to the same magnetic pattern 101, 102 have substantially the same width in the radial direction of the disc 100.

The portions of spirals 111 of the first magnetic pattern 101 are portions of Archimedean spirals according to the equations:

$$R = C_1(\varphi + \varphi_{0j}), \text{ with } \varphi_{0j} = 360i/N1 \text{ and } i=1,2,\ldots N1 \quad \text{(Eq. 1)}$$

R and φ are polar coordinates of a polar coordinate system including the midpoint 114 of the disc 100 as origin, C1 is the pitch of the portion of spirals 111, and $\varphi_{0i}$ is the starting angle of the respective spirals.

The portions of spirals 112 of the second magnetic pattern 102 analogously are portions of Archimedean spirals according to the equations:

$$R=C2(\varphi+\varphi_{0j}), \text{ with } \varphi_{0j}=360j/N2 \text{ and } j=1,2,\ldots N2 \quad \text{(Eq. 2)}$$

C2 being the pitch of the portion of spirals 112 and $\varphi_{0j}$ the starting angle of the respective spirals.

In other embodiments, the portions of spirals 111, 112 of the first and second magnetic patterns 101, 102 are not necessarily Archimedean spirals, and could be spirals in the form of circle involutes.

The portions of spirals 111 of the first magnetic pattern 101 are magnetized in a direction substantially parallel with the rotational axis of the disc 100. The magnetizations of adjacent spirals 111 of the first magnetic pattern 101 differ by at least a first predetermined amount from each other, so that the magnetic field generated by the spirals 111 of the first magnetic pattern 101 alternates between two different predetermined values when passing from one spiral 111 to the other along a direction that is perpendicular to the spirals 111.

The portions of spirals 112 of the second magnetic pattern 102 are analogously magnetized in a direction substantially parallel with the rotational axis of the disc 100. The magnetizations of adjacent spirals of the second magnetic pattern 102 differ by at least a second predetermined amount from each other, so that the magnetic field generated by the spirals 112 of the second magnetic pattern 102 alternates between two different predetermined values when passing from one spiral 112 to the other along a direction that is perpendicular to the spirals 112.

Adjacent spirals 111, 112 of the first and/or second magnetic pattern 101, 102 have different magnetic poles. In such a magnetic configuration, the variation of the magnetic field can be detected by the magnetic sensors with high accuracy.

Figure 2A:
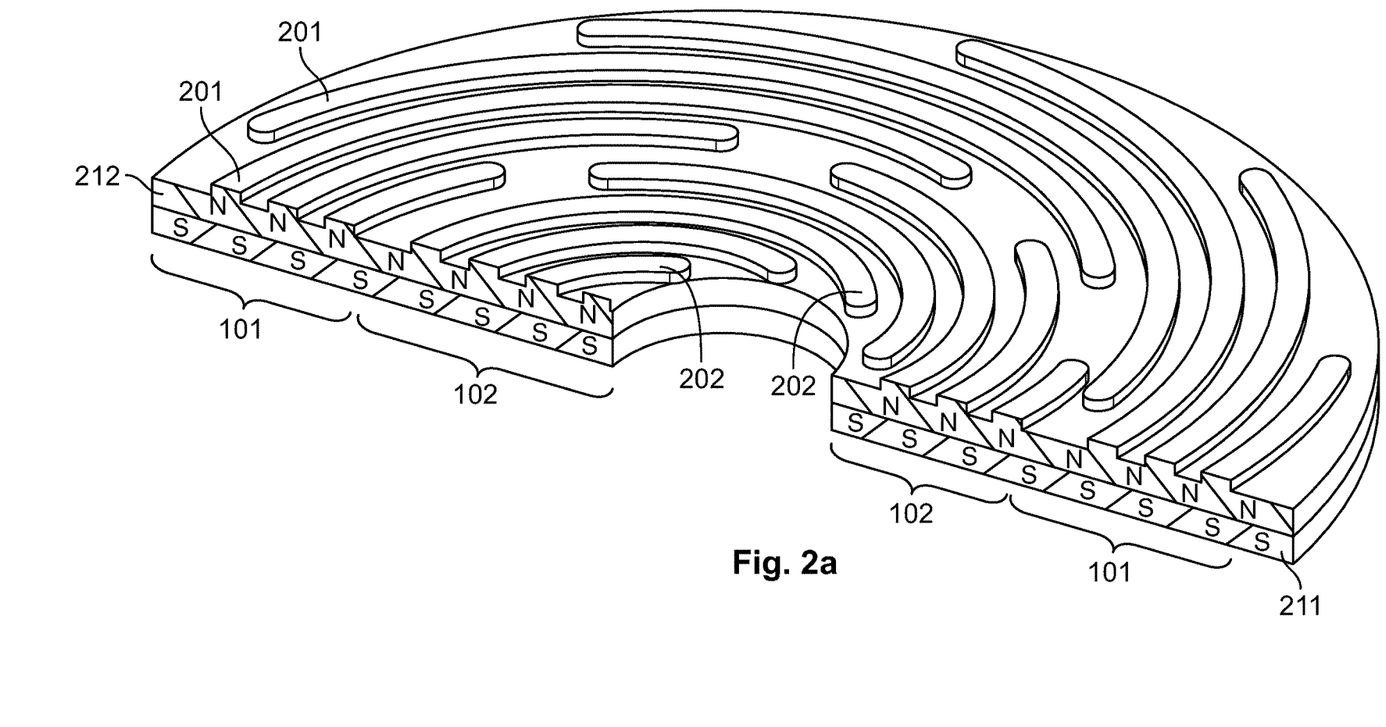
FIG. 2a is a sectional view of a first structure of spirals of the disc of FIG. 1.
Figure 2B:
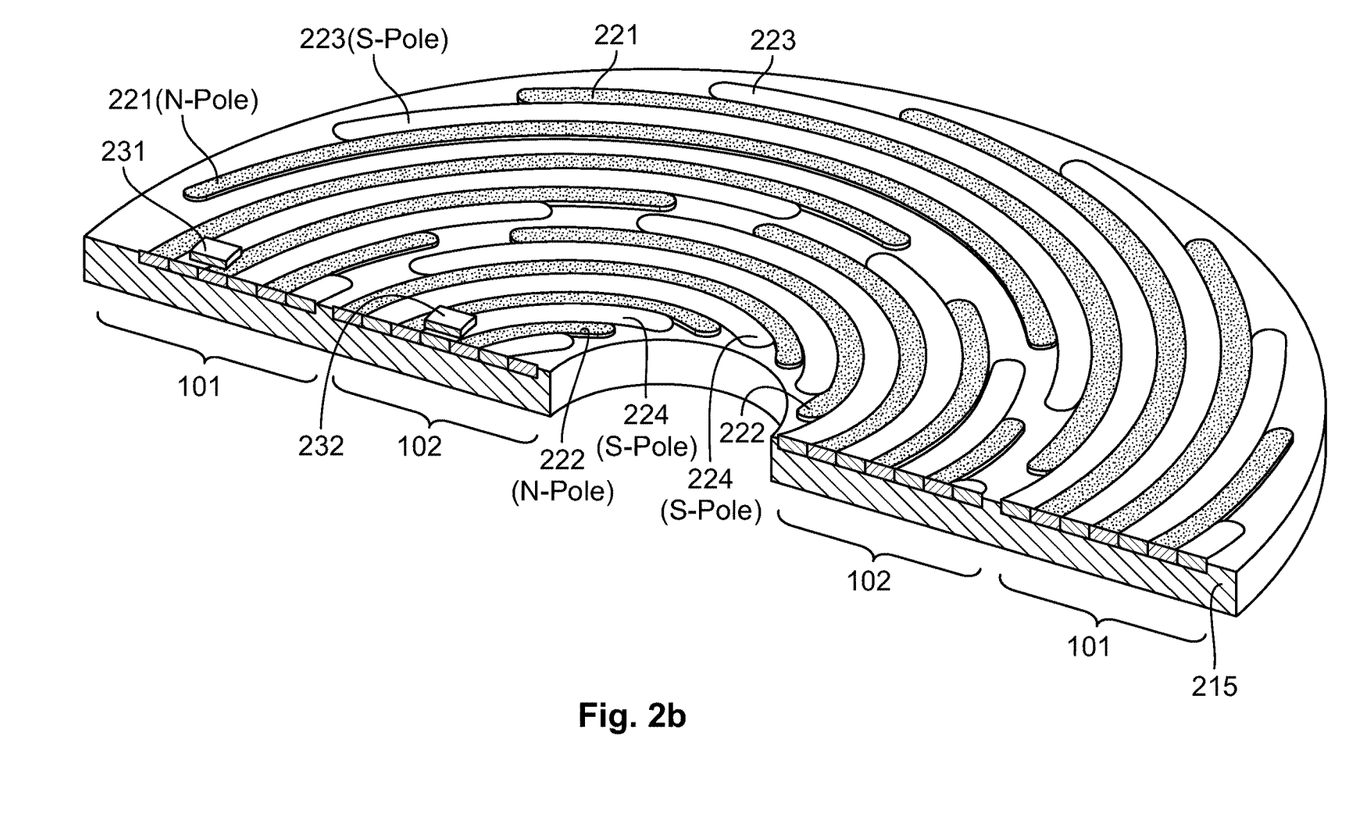
FIG. 2b is a sectional view of a second structure of spirals of the disc of FIG. 1.
Figure 2C:
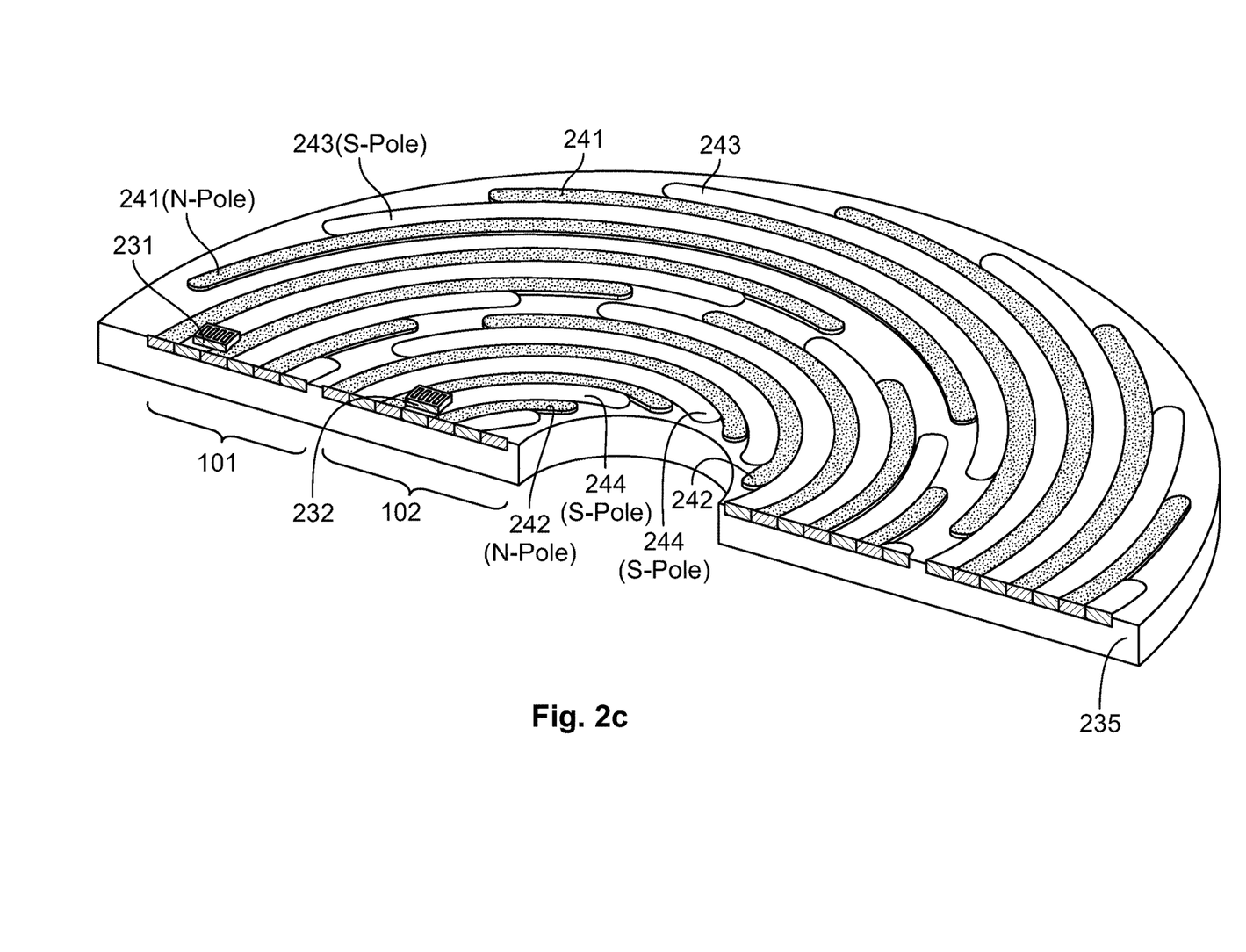
FIG. 2c is a sectional view of a third structure of spirals of the disc of FIG. 1.
Figure 2D:
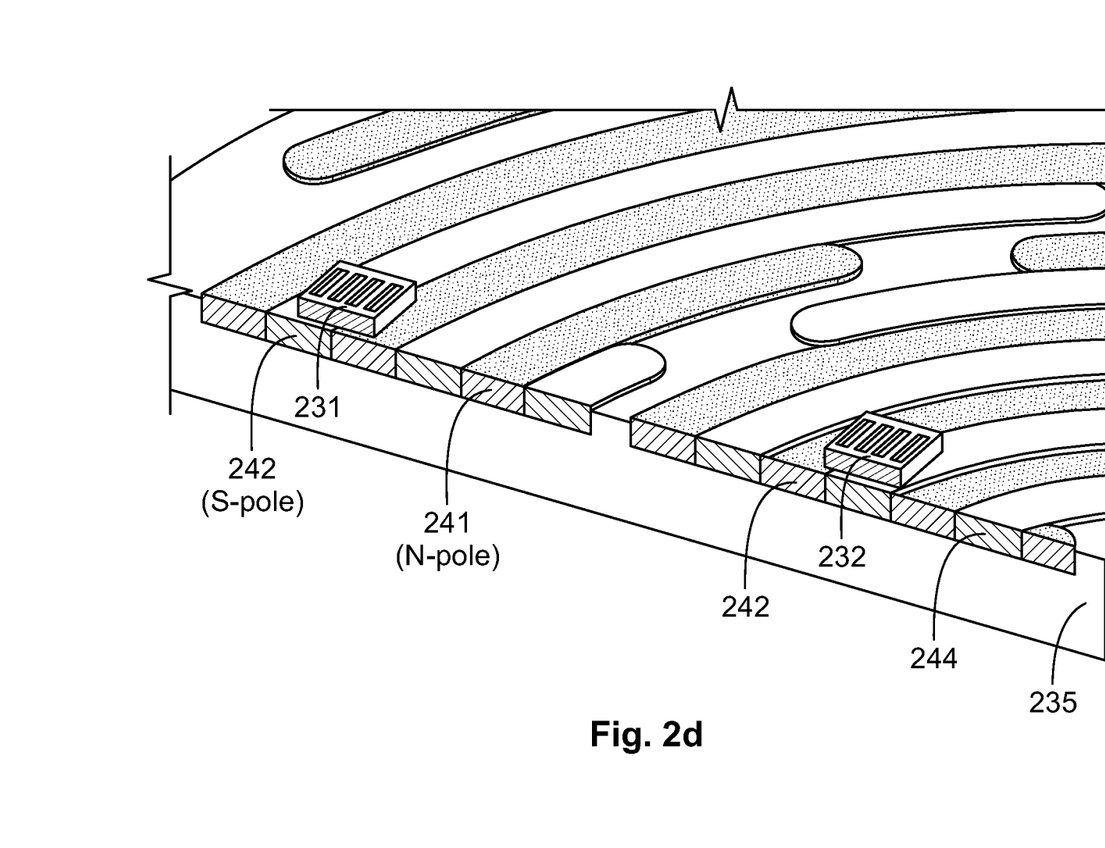
FIG. 2d is an enlarged view of FIG. 2c.

FIGS. 2a, 2b, and 2c show embodiments of a structure of spirals 111, 112 implemented on the disc 100.

The disc 100 shown in FIG. 2a is formed by two magnetized disc halves 211 and 212. Disc half 212 shows protrusions 201 forming spirals 111 of the first magnetic pattern 101 and protrusions 202 forming spirals 112 of the second magnetic pattern 102 on one side thereof, whose shape corresponds to Archimedean spirals complying with the above equations or circle involutes. The other side of disc half 212 is combined/bonded with a side of disc half 211, so that the combined disc 100 shows at the upper side one magnetic pole, for example, an N-pole, and at the lower side the other magnetic pole, for example, the S-pole. Due to this structure, the magnetic field on the upper side of the combined disc, including the protrusions 201, 202, is modulated and varies in accordance with the shape of the protrusions 201, 202. A magnetic inductance in regions corresponding to the protrusions 201, 202 differs from a magnetic inductance corresponding to regions between adjacent protrusions 201, 202 by a predetermined amount. The magnetization of the spirals 111, 112 can be achieved by, for example, a molded form which is magnetized, bipolar magnetic tracks which are being magnetized by coils, magnetic recording heads, or magnetic printing methods.

In the embodiment shown in FIG. 2b, spirals 221-224 are formed by magnetized layers or tracks which are attached to or bonded to an upper side of a carrier disc 215. The layers or tracks have a substantially uniform magnetization. The magnetized layers corresponding to adjacent spirals 221-224 show different magnetic poles. In the embodiment shown in FIG. 2b, the spirals 221, 223 corresponding to spirals 111 of the first magnetic pattern 101 have an S-pole 223 and an N-pole 221, and the spirals 222, 224 corresponding to the spirals 112 of the second magnetic pattern 102 have an S-pole 224 and an N-pole 222.

In the embodiment shown in FIG. 2c, magnetic tracks or layers forming spirals 241-244 are integrated into an upper side of the carrier disc 235, and do not stick out from the side of the disc 235. Being integrated in the carrier disc 235, the spirals 241-244 are protected, and collisions between the spirals 241-244 and the magnetic sensors 231, 232 do not occur. As in FIG. 2b, the magnetized layers or tracks corresponding to adjacent spirals 241-244 show different magnetic poles, and the shape of the spirals 241-244 corresponds to Archimedean spirals complying with the above equations or circle involutes. The spirals 241 and 243 correspond to the first magnetic pattern 101, and the spirals 242 and 244 correspond to the second magnetic pattern 102.

In FIGS. 2b and 2c, the spirals corresponding to the first magnetic pattern 101 have all the same width, irrespective of their magnetization. Analogously, the spirals corresponding to the second magnetic pattern 102 all have the same width, irrespective of their magnetization. Furthermore, FIGS. 2b and 2c show that adjacent spirals of the first magnetic pattern 101 are directly adjacent to each other, and adjacent spirals of the second magnetic pattern 102 are directly adjacent to each other. No non-magnetized region exists between two adjacent spirals in the embodiments of FIGS. 2b and 2c.

The two magnetic sensors 231, 232 are shown in FIGS. 2b, 2c, 2d, 3, and 4. As shown in FIG. 2b, the first magnetic sensor 231 and the second magnetic sensor 232 are fixedly arranged relative to each other. The magnetic sensors 231, 232 are anisotropic magneto-resistive bridges (AMR-bridges).

The first magnetic sensor 231 corresponds to the first magnetic pattern 101 and is arranged near to the spirals of the first magnetic pattern 101 so as to detect N1 complete rotations of the magnetic inductance vector over a full mechanical rotation of the disc 100. The second magnetic sensor 232 corresponds to the second magnetic pattern 102 and is arranged near to the spirals of the second magnetic pattern 102 so as to detect N2 complete rotations of the magnetic inductance vector over a full mechanical rotation of the disc 100. Each magnetic pattern 101, 102 and its associated magnetic sensor 231, 232 are arranged in such a way that, during a full mechanical revolution of the disc 100, the magnetic sensor 231, 232 passes over each spiral of the respective magnetic pattern 101, 102.

Each of the first and second magnetic sensors 231, 232 outputs an electrical signal including a cos-signal and a sin-signal in response to the detected magnetic inductance of the respective magnetic pattern 101, 102. Each of the cos-signal and the sin-signal contains a number of periods corresponding to the number of rotations of the magnetic inductance detected by the respective magnetic sensor 231, 232.

The angle sensor further comprises a processing unit, for example, a digital signal processor, adapted to determine a first arctan-signal based on the cos- and sin-signal output by the first magnetic sensor 231, to determine a second arctan-signal based on the cos- and sin-signal output by the second magnetic sensor 232, and to determine a signal corresponding to the absolute angular position of the disc 100 based on the first and second arctan-signal. As the numbers N1 and N2 are coprime, the absolute angular position of the disc is uniquely determined by this signal.

Figure 3:
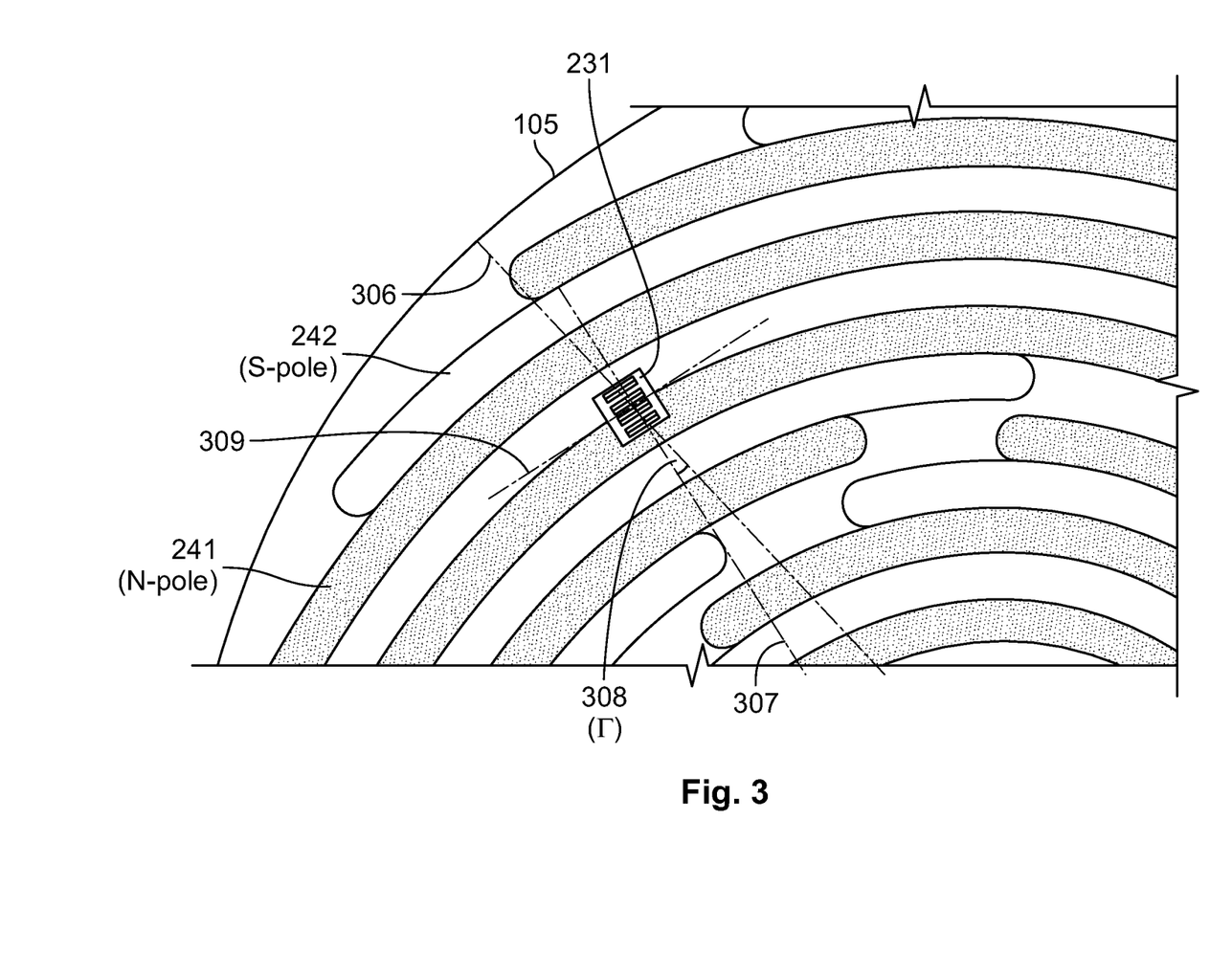
FIG. 3 is a plan view of a magnetic sensor of the disc of FIG. 1.

Each of the magnetic sensors 231, 232, as shown in FIG. 3, has four magneto-resistive layers 416-419, as described in greater detail below. In the shown embodiment, the magneto-resistive layers of the first magnetic sensor 231 are aligned in a direction 307 that is perpendicular to the tangent 309 of any spiral 241-244 of the respective magnetic pattern, thereby forming an angle φ with the radius 306 of the disc 100. The angle φ, having the reference numeral 308, is given by the following formula:

$$\varphi\varphi = \arctan(R/C) \tag{Eq. 3}$$

R is the radial position of the first magnetic sensor 231 relative to the center point 104 of the disc 100, and C is the pitch of the respective spiral.

Figure 4A:
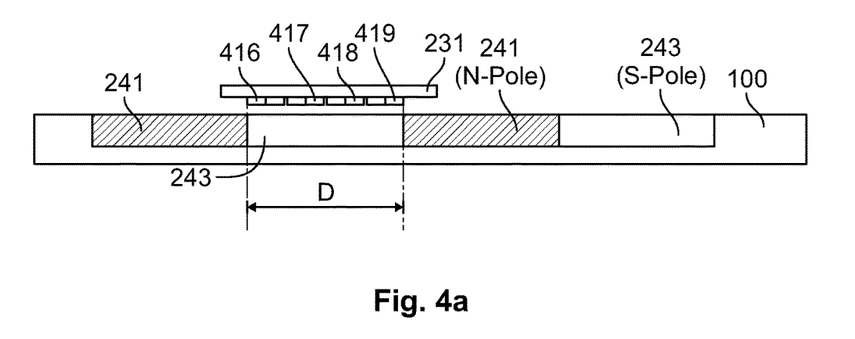
FIG. 4a is a sectional view of a first arrangement of the disc of FIG. 1 and the magnetic sensor.
Figure 4B:
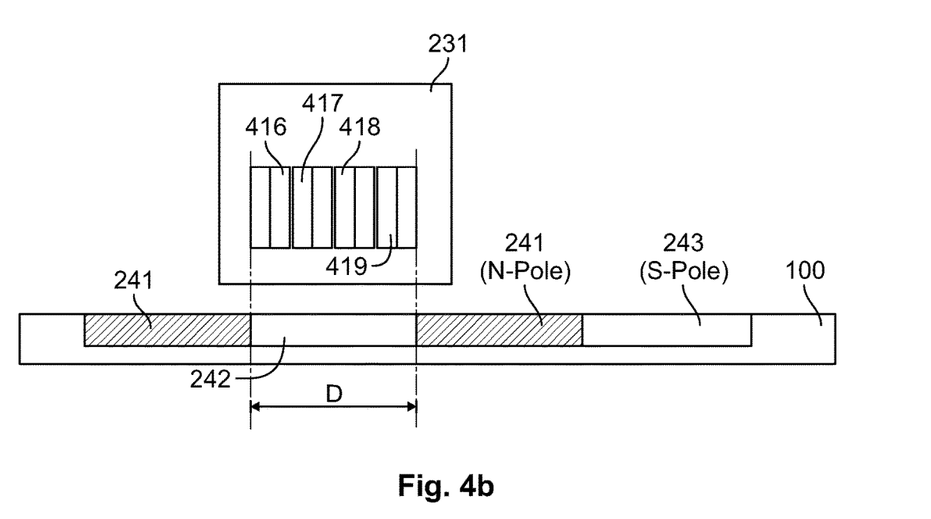
FIG. 4b is a sectional view of a second arrangement of the disc of FIG. 1 and the magnetic sensor.

The four magneto-resistive layers 416-419 of each of the magnetic sensors 231, 232 are shown in FIGS. 4a and 4b. FIGS. 4a and 4b show the arrangement of the four magneto-resistive layers 416-419 relative to the spirals 241-244 of the magnetic pattern 101, 102 of the disc 100. The magneto-resistive layers 416 and 418 are adapted to generate the cos-signal and the magneto-resistive layers 417 and 419 are adapted to generate the sin-signal, in response to the detected magnetic field.

In the embodiment shown in FIG. 4a, the surfaces of the four magneto-resistive layers 416-419 of the first magnetic sensor 231 are positioned parallel to the disc 100. A width D of the first magnetic sensor 231 matches the width of the spiral 243. In the embodiment shown in FIG. 4b, the surfaces of the four magneto-resistive layers 416-419 of the first magnetic sensor 231 are positioned perpendicular to the disc 100. The embodiments shown in FIGS. 4a and 4b are equally applicable to the positioning of the second magnetic sensor 232 on the disc 100.

Figure 5:
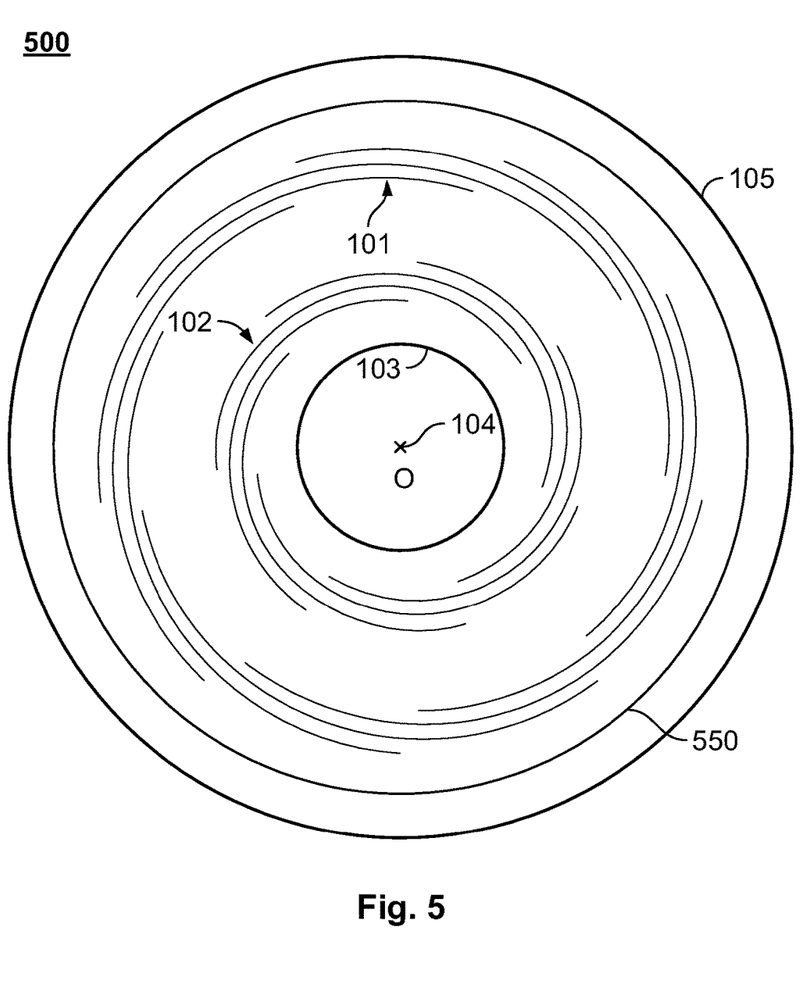
FIG. 5 is a plan view of another disc used in an angle sensor according to the invention.

A disc 500 used in an angle sensor according to another embodiment of the invention is shown in FIG. 5. Disk 500 differs from the disk 100 in that it further comprises a circular magnetic structure 550 on the side of the disc 500 including the first magnetic pattern 101 and the second magnetic pattern 102. The circular magnetic structure 550 has a circular magnetization, is concentrically arranged around the center point 104 of the disc 500, and surrounds the first magnetic pattern 101 and the second magnetic pattern 102. N1 is the number of spirals of the first magnetic pattern 101 and N2 is the number of spirals of the second magnetic pattern 102. In the disc 500, similarly to the disc 100, the numbers N1 and N2 are coprime, wherein the number N1 is different from the numbers N2−1 and N2+1. Specifically for the disc in FIG. 5, N1 is equal to 9, and N2 is equal to 7.

An angle sensor according to the embodiment shown in FIG. 5 further comprises a third magnetic sensor for sensing the magnetic field generated by the circular magnetic structure 550. By sensing the magnetic field of the circular magnetic structure 550, the angle sensor according to the embodiment shown in FIG. 5 is able to determine the position of the circular magnetic structure 550 so as to perform eccentricity error corrections.

Figure 6:
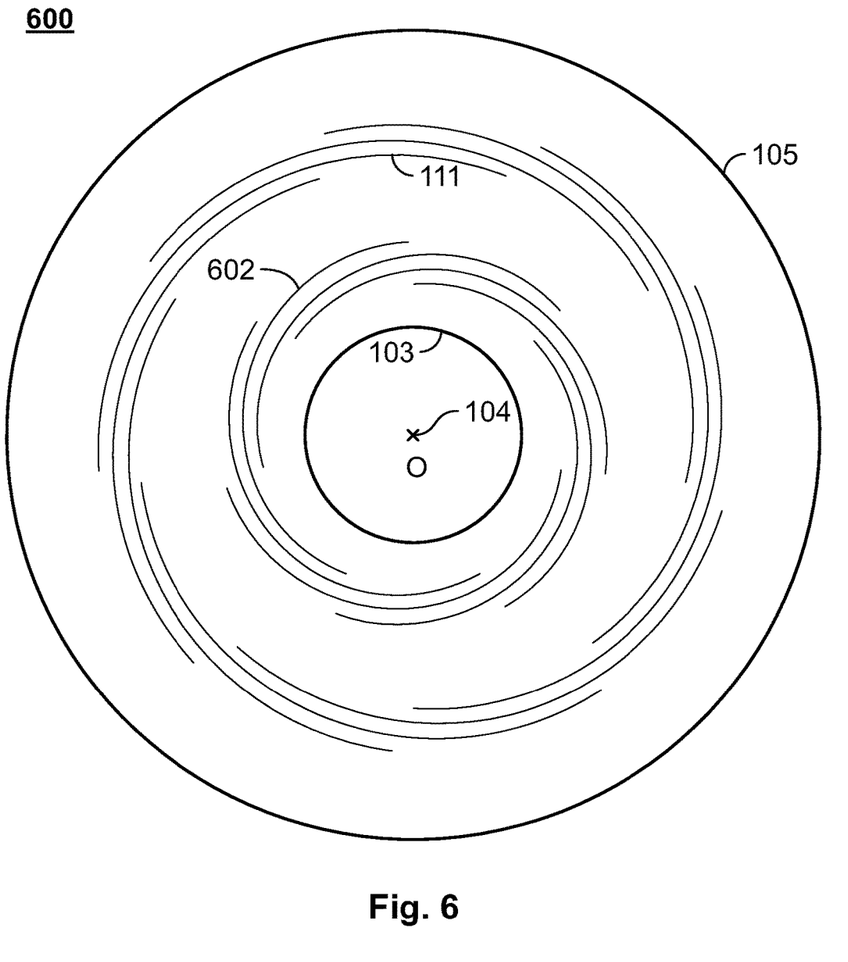
FIG. 6 is a plan view of another disc used in an angle sensor according to the invention.

A disc 600 used in an angle sensor according to another embodiment of the invention is shown in FIG. 6. Disc 600 differs from the disk 100 in that the spirals 602 of second magnetic pattern 102 rotate in a direction that is opposite to the rotation direction of the spirals 111 of the first magnetic pattern 101. N1 is the number of spirals of the first magnetic pattern 101 and N2 is the number of spirals of the second magnetic pattern 102. In the disc 600, similarly to the disc 100, the numbers N1 and N2 are coprime, wherein the number N1 is different from the numbers N2−1 and N2+1. Specifically for the disc in FIG. 6, N1 is equal to 9, and N2 is equal to 7.

Any of the structures of spirals shown in FIGS. 2a, 2b and 2c can be implemented on a disc of an angle sensor according to the embodiments shown in FIGS. 5 and 6.

The angle sensor according to the present invention is applicable, for instance, in motor feedback systems, in landing airbrakes, in starter generators, in electrical engines, and in steer angles.

Advantageously, in the angle sensor according to embodiments of the present invention, the number of spirals in a ring can be significantly decreased since the number of spirals N1 in one ring of the two rings and the number of spirals N2 in the other ring of the two rings are coprime, and the number N1 is different from the numbers N2−1 and N2+1, creating an angle sensor that is less expensive to produce. Furthermore, the angle sensor is less prone to external magnetic stray fields than known angle sensors, due to the arrangements shown in FIGS. 4a and 4b, and consequently is magnetically robust and accurate in determining the absolute angular position.

What is claimed is:

1. An angle sensor, comprising:
   a disc;
   a first magnetic pattern disposed on a side of the disc and including a number N1 of first portions of spirals regularly distributed in a first ring;
   a second magnetic pattern disposed on a side of the disc and including a number N2 of second portions of spirals regularly distributed in a second ring, N1 and N2 are coprime and N1 is different from N2, N2−1, and N2+1; and
   a first magnetic sensor being a first magneto-resistive bridge having a plurality of first magneto-resistive layers, an entire width of the first magneto-resistive bridge equal to a width of one spiral of the first portions of spirals.

2. The angle sensor of claim 1, wherein the first ring and the second ring are concentrically arranged around a center point of the disc.

3. The angle sensor of claim 2, wherein the second ring is positioned interior of the first ring.

4. The angle sensor of claim 3, wherein N1 is greater than N2.

5. The angle sensor of claim 1, further comprising a second magnetic sensor.

6. The angle sensor of claim 5, wherein the first magnetic sensor is fixedly arranged relative to the second magnetic sensor.

7. The angle sensor of claim 6, wherein the disc is rotatable relative to the first magnetic sensor and the second magnetic sensor around a rotational axis of the disc.

8. The angle sensor of claim 7, wherein the first portions of spirals and the second portions of spirals extend on the disc in a same direction.

9. The angle sensor of claim 7, wherein the first portions of spirals and the second portions of spirals extend on the disc in opposite directions.

10. The angle sensor of claim 7, wherein the first magnetic sensor is associated with the first magnetic pattern and outputs a first electrical signal when the first magnetic pattern and the first magnetic sensor rotate relative to each other, and the second magnetic sensor is associated with the second magnetic pattern and outputs a second electrical signal when the second magnetic pattern and the second magnetic sensor rotate relative to each other.

11. The angle sensor of claim 1, wherein the second magnetic sensor is a second magneto-resistive bridge having a plurality of second magneto-resistive layers, an entire width of the second magneto-resistive bridge equal to a width of one spiral of the second portions of spirals.

12. The angle sensor of claim 11, wherein the first magneto-resistive bridge and the second magneto-resistive bridge are anisotropic magneto-resistive bridges.

13. The angle sensor of claim 1, wherein the first portions of spirals and the second portions of spirals are magnetized in a direction substantially parallel with a rotational axis of the disc.

14. The angle sensor of claim 13, wherein magnetizations of adjacent first portions of spirals differ by at least a first predetermined amount from each other and magnetizations of adjacent second portions of spirals differ by at least a second predetermined amount from each other.

15. The angle sensor of claim 14, wherein adjacent first portions of spirals and adjacent second portions of spirals have different magnetic poles.

16. The angle sensor of claim 1, wherein the first portions of spirals all have a first width and the second portions of spirals all have a second width.

17. The angle sensor of claim 1, wherein adjacent first portions of spirals are directly adjacent to each other and adjacent second portions of spirals are directly adjacent to each other.

18. The angle sensor of claim 1, wherein the first portions of spirals and the second portions of spirals are Archimedean spirals.

19. The angle sensor of claim 1, further comprising a circular magnetic structure disposed on a side of the disc concentrically around a center point of the disc and surrounding the first ring and the second ring.

20. The angle sensor of claim 1, wherein the disc is formed by a first magnetized half and a second magnetized half, each of the first magnetized half and the second magnetized half forming one side of the disc, the first magnetized half and the second magnetized half having an opposite polarity.

21. The angle sensor of claim 1, wherein the first portions of spirals and second portions of spirals are embedded in the side of the disc and are flush with the side of the disc.

* * * * *